US012770583B2

(12) United States Patent
Nomura et al.

(10) Patent No.: US 12,770,583 B2
(45) Date of Patent: Oct. 20, 2026

(54) INFORMATION PROCESSING SYSTEM. CONTROLLER, AND CONTROL METHOD FOR DIFFUSION OF A QUANTIZATION ERROR

(71) Applicant: Lenovo (Singapore) Pte. Ltd., Singapore (SG)

(72) Inventors: Ryohta Nomura, Kanagawa (JP); Yoshitsugu Suzuki, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 19/175,310

(22) Filed: Apr. 10, 2025

(65) Prior Publication Data

US 2025/0329305 A1 Oct. 23, 2025

(30) Foreign Application Priority Data

Apr. 17, 2024 (JP) ................................ 2024-066942

(51) Int. Cl.
*G09G 3/34* (2006.01)
*G09G 3/20* (2006.01)

(52) U.S. Cl.
CPC ........... *G09G 3/344* (2013.01); *G09G 3/2044* (2013.01); *G09G 3/2059* (2013.01); (Continued)

(58) Field of Classification Search
CPC .... G09G 3/344; G09G 3/2044; G09G 3/2059; G09G 2310/04; G09G 2320/043; G09G 2320/103; G09G 2330/021; G09G 5/34; G09G 5/14; G09G 2320/0252; G09G 2320/0257; G09G 2320/0686; G09G 2340/0428; G09G 2360/16
See application file for complete search history.

(56) References Cited

U.S. PATENT DOCUMENTS 9,245,485 B1 * 1/2016 Hu ......................... G09G 3/344
11,132,823 B2 * 9/2021 Itou ..................... G06F 3/04845
(Continued)

FOREIGN PATENT DOCUMENTS

JP 2000284755 A 10/2000
JP 2013205731 A 10/2013
(Continued)

*Primary Examiner* — David D Davis
(74) *Attorney, Agent, or Firm* — Osha Bergman Watanabe & Burton LLP

(57) ABSTRACT

A display unit includes a controller and an electrophoretic display panel, in which the controller drives a pixel disposed in the electrophoretic display panel based on a quantized value indicating a gradation for each pixel, a host system specifies a dynamic region in which a display content dynamically fluctuates for each element of a display image to be displayed on the display unit, and the controller quantizes a gradation value for each pixel included in the dynamic region with 1 bit to compute the quantized value, diffuses a quantization error of each pixel to other pixels arranged within a predetermined range from the pixel in the dynamic region of the element and update the quantized value of the other pixels, and does not diffuse the quantization error of the pixel outside the dynamic region.

5 Claims, 6 Drawing Sheets

(52) U.S. Cl.
CPC ... *G09G 2310/04* (2013.01); *G09G 2320/043* (2013.01); *G09G 2320/103* (2013.01); *G09G 2330/021* (2013.01)

(56) References Cited

U.S. PATENT DOCUMENTS

| | | | | |
|---|---|---|---|---|
| 2015/0138122 | A1* | 5/2015 | Cho | G06F 1/1684<br>345/173 |
| 2020/0286274 | A1* | 9/2020 | Itou | G06F 3/04842 |

FOREIGN PATENT DOCUMENTS

| | | | |
|---|---|---|---|
| JP | 2015057637 | A | 3/2015 |
| JP | 2015064421 | A | 4/2015 |
| JP | 2015152608 | A | 8/2015 |
| JP | 2015212749 | A | 11/2015 |
| JP | 2018508820 | A | 3/2018 |
| JP | 2023539036 | A | 9/2023 |
| KR | 20050052194 | A | 6/2005 |

* cited by examiner $$\frac{1}{16}\begin{bmatrix} & * & 7 \\ 3 & 5 & 1 \end{bmatrix}$$

FIG. 6

$$\begin{bmatrix} & & * & \frac{1}{8} & \frac{1}{8} \\ \cdots & \frac{1}{8} & \frac{1}{8} & \frac{1}{8} & \cdots \\ \cdots & & \frac{1}{8} & & \cdots \end{bmatrix}$$

FIG. 7

$$\frac{1}{48}\begin{bmatrix} - & - & \# & 7 & 5 \\ 3 & 5 & 7 & 5 & 3 \\ 1 & 3 & 5 & 3 & 1 \end{bmatrix}$$

FIG. 8

INFORMATION PROCESSING SYSTEM. CONTROLLER, AND CONTROL METHOD FOR DIFFUSION OF A QUANTIZATION ERROR

CROSS-REFERENCE TO RELATED APPLICATIONS

This application claims priority to Japanese Patent Application No. 2024-066942 filed on Apr. 17, 2024, the contents of which are hereby incorporated herein by reference in their entirety.

TECHNICAL FIELD

The present application relates to an information processing system, a controller, and a control method, for example, to diffusion of a quantization error.

BACKGROUND

An electrophoretic display (EPD) does not consume power while displaying stationary content, and thus is capable of displaying various types of information with low power consumption. The EPD may be used for displaying information primarily in a form of text. For example, Japanese Unexamined Patent Application Publication No. 2015-64421 discloses an application to an electronic book terminal, an electronic medical record, an electronic newspaper, and the like. The EPD is also referred to as an electronic paper display, an electronic ink display, or the like.

However, the EPD has lower responsiveness of display change than other types of display devices, such as a liquid crystal display and an organic light emitting diode display. In particular, when representing gradation with multiple bits, a delay in change tends to be remarkable. In a typical EPD, a response time for 1-bit gradation that displays two levels of gradation is about 100 msec, but a response time for 4-bit gradation that displays 16 levels of gradation reaches 500 msec. In general, in the EPD, the greater the gradation bit depth, the smoother the gradation for displaying an image; however, the responsiveness decreases.

In a 1-bit image, dithering is performed to diffuse a quantization error for each pixel to surrounding pixels, thereby making it possible to increase a ratio of bright pixels in portions with higher brightness in an original image. By dithering, a quantization error that occurs during low-bit conversion and a phenomenon (tone jump) in which gradation significantly fluctuates from original data on a display are visually alleviated, making it possible to represent multi-bit gradation in a macro manner and in a pseudo manner even in a 1-bit image. The diffusion of the quantization error is realized by executing matrix computation for each pixel. Diffusion destination pixels include pixels adjacent in row and column directions to a pixel of interest as a computation target. In addition, in the diffusion of the quantization error, the pixel of interest is sequentially changed to an unprocessed adjacent pixel, and the matrix computation is repeated. Therefore, the quantization error occurring in one target pixel propagates while accumulating in a direction of the diffusion destination. The diffusion of the quantization error causes a change in quantized gradation, and thus requires rewriting of a screen in a display panel. Due to the nature of the dithering, a range in which rewriting is necessary is not limited to a pixel in which the change in gradation actually occurs, but also extends to a wide range of pixels as a destination of the propagation of the quantization error. On the other hand, when the quantization error is not propagated after the screen is rewritten, a timing of executing the dispersion of the quantization error is different between a pixel whose gradation is rewritten and a pixel whose gradation is not rewritten. Therefore, an afterimage may remain permanently in a region where the gradation is rewritten, which may cause a user to feel a sense of discomfort.

On the other hand, the EPD consumes power during rewriting. The power consumption during rewriting may be higher than power consumption of other types of display devices, such as a liquid crystal display (LCD) and an organic light emitting diode (OLED) display. In addition, the EPD has a rewrite lifespan. The rewrite lifespan is typically about 10 million times. Assuming continuous operation at 10 frames per second (FPS), an end of the lifespan is reached about 278 hours after start of use. Therefore, it is expected to extend a period to reach the end of the lifespan.

SUMMARY

An information processing system according to a first aspect of the present application includes: a host system; and a display unit, in which the display unit includes a controller and an electrophoretic display panel, the controller is configured to drive pixels arranged on the electrophoretic display panel based on a quantized value indicating gradation for each of the pixels, the host system is configured to specify a dynamic region in which display content dynamically fluctuates for each element of a display image to be displayed on the display unit, and the controller is configured to quantize a gradation value of each pixel included in the dynamic region with 1 bit to compute the quantized value, diffuse a quantization error of each pixel to other pixels arranged within a predetermined range from the pixel in the dynamic region of the element and update the quantized value of the other pixels, and not diffuse the quantization error outside the dynamic region.

In the information processing system, the host system may be configured to determine a display region of a video image included in the display image as the dynamic region.

In the information processing system, the host system may be configured to determine a display region of an application image that is included in the display image and that transits as the dynamic region.

In the information processing system, the host system may be configured to detect an edge from the display image, and determine a region that is surrounded by the edge and in which display content dynamically fluctuates as the dynamic region.

A controller according to a second aspect of the present application is a controller that drives pixels arranged on an electrophoretic display panel based on a quantized value indicating gradation for each of the pixels, the controller being configured to quantize a gradation value of each pixel included in a dynamic region of each element of a display image notified by a host system at a bit depth lower than a bit depth of a pixel included in a non-dynamic region to compute the quantized value, diffuse a quantization error of each pixel to other pixels arranged within a predetermined range from the pixel in the dynamic region of the element and update the quantized value of the other pixels, and not diffuse the quantization error of the pixel outside the dynamic region.

A control method according to a third aspect of the present application is a control method for an information processing system including a host system and a display unit, in which the display unit includes a controller and an electrophoretic display panel, the controller is configured to drive pixels arranged on the electrophoretic display panel based on a quantized value indicating gradation for each of the pixels, the control method including: via the host system, specifying a dynamic region in which display content dynamically fluctuates for each element of a display image to be displayed on the display unit; and, via the controller, quantizing a gradation value of each pixel included in the dynamic region at a bit depth lower than a bit depth of a pixel included in a non-dynamic region to compute the quantized value, quantizing the gradation value of each pixel included in the dynamic region with 1 bit to compute the quantized value, diffusing a quantization error of each pixel to other pixels arranged within a predetermined range from the pixel in the dynamic region of the element and updating the quantized value of the other pixels, and not diffusing the quantization error outside the dynamic region.

The above-described aspects of the present application can reduce unnecessary rewriting of a display panel due to dithering and to extend a period to reach an end of a lifespan. In addition, it is possible to reduce power consumption by reducing the rewriting accompanied by the power consumption.

BRIEF DESCRIPTION OF THE DRAWINGS

FIG. 6 is a diagram illustrating a first example of a matrix related to dithering.

FIG. 7 is a diagram illustrating a second example of a matrix related to dithering.

FIG. 8 is a diagram illustrating a third example of a matrix related to dithering.

DETAILED DESCRIPTION

Figure 1:
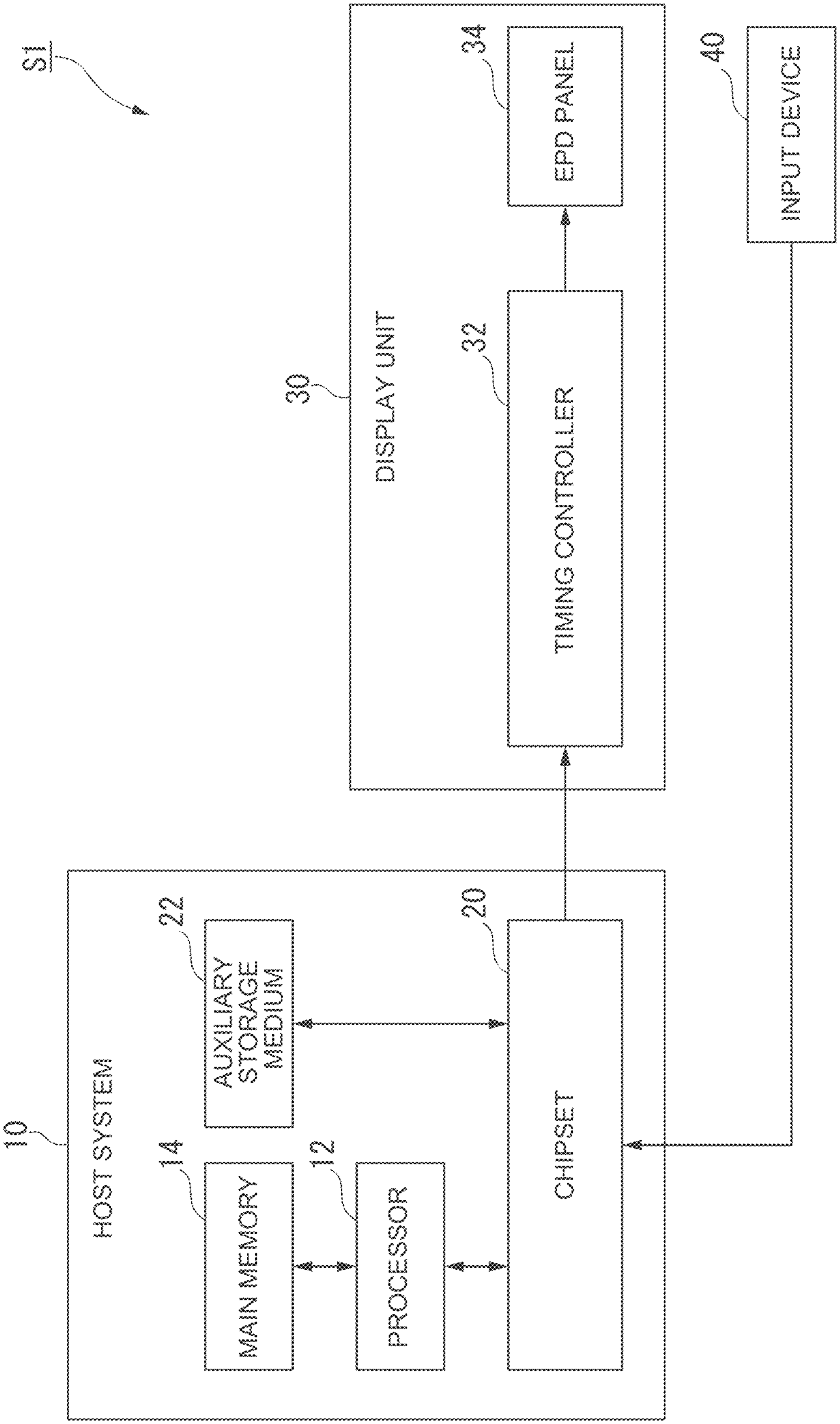
FIG. 1 is a schematic block diagram illustrating a hardware configuration example of an information processing system according to the one or more embodiments.

Hereinafter, embodiments of the present application will be described with reference to the drawings. First, a configuration example of an information processing system S1 according to one or more embodiments of the present application will be described. FIG. 1 is a schematic block diagram illustrating a hardware configuration example of the information processing system S1 according to the one or more embodiments.

The information processing system S1 includes a host system 10, a display unit 30, and an input device 40. The information processing system S1 may be realized as a single electronic apparatus having all of the host system 10, the display unit 30, and the input device 40. In addition, the information processing system S1 may be configured such that the host system 10 and either or both of the display unit 30 and the input device 40 are separate. The information processing system S1 may be realized as any type of information processing apparatus, such as a personal computer, a tablet terminal, a mobile phone, or an electronic book reader. The host system 10 acquires display data indicating a display image according to various programs, and outputs the acquired display data to the display unit 30. The host system 10 may monitor an operation signal input from the input device 40 and operate based on the input operation signal. In the present application, the operation based on the operation signal input from the input device 40 may be referred to as "operating in response to an operation" or the like.

The display unit 30 is an electronic paper display (EPD) device that displays the display image based on the display data input from the host system 10. The EPD device is an electrophoretic display device having pixels employing an electrophoretic method. The display image, or simply the image, means display content displayed on a screen, that is, a spatial change in brightness or color. The display image includes, as an element, a pattern, a figure, a symbol, a character, or a combination of some or all of these. The display unit 30 has a screen in which pixels are arranged at regular arrangement intervals, and displays the display image based on the display data input from the host system 10 on a display medium. The display unit 30 is capable of displaying the display image in accordance with any of a plurality of predetermined types of drive modes.

A bit depth of a gradation value indicating gradation for each pixel is different depending on the drive mode. The gradation corresponds to a brightness of the pixel, that is, a density or shade. The gradation value is also referred to as a pixel value or a signal value. In particular, the gradation value related to color display is also referred to as a color signal value. The bit depth corresponds to the number of bits representing the gradation value. The greater the bit depth, the wider the range of the gradation value, but the range of the gradation to be represented is common. That is, regardless of the bit depth, the gradation corresponding to the maximum value and the minimum value of the gradation value is common. The greater the bit depth, the smaller a difference in gradation between adjacent gradation values (also referred to as a gradation width). When the bit depth is 1 bit, only two gradations corresponding to first gradation (for example, black in a case of monochrome) corresponding to the maximum value (for example, 1) and second gradation (for example, white) corresponding to the minimum value (for example, 0) are represented. Note that while the greater bit depth allows more levels of gradation to be represented, the responsiveness of the pixel decreases. When the pixels are driven with a bit depth greater than 2 bits, the refresh process is required for every predetermined refresh cycle.

The input device 40 is capable of receiving an operation of the user, and generates an operation signal in response to the received operation. The input device 40 outputs the generated operation signal to the host system 10. As the input device 40, for example, a general-purpose device such as a touch sensor, a mouse, a keyboard, or a joystick may be used, or a dedicated device such as a button, a knob, or a dial may be used. The touch sensor applied as the input device 40 may be integrated with an electrophoretic display (EPD) panel 34 of the display unit 30 and configured as a touch panel.

The host system 10 according to one or more embodiments specifies, for each element of the display image displayed on the display unit 30, a region in which an image constituting display content steadily fluctuates over time as a dynamic region. This dynamic region is also referred to as a steady dynamic region. Typical elements of the display image include, for example, an image (in the present application, may be referred to as an "application image") acquired by executing an application program (in the present application, may be referred to as an "application" or an "app"), an element image constituting an operation of an operating system (OS), and various video images. The element image constituting the operation of the OS includes, for example, a screen component such as a window and an icon. The screen component is also referred to as a user interface (UI) component. In general, an image is represented by a distribution of gradation values for pixels arranged adjacent to each other at different positions, that is, a gradation distribution. The image fluctuation is represented by a change in gradation distribution between frames. The host system 10 notifies the display unit 30 of a display image, its element, and a dynamic region in which display content dynamically fluctuates for each element.

The display unit 30 quantizes the gradation value in the dynamic region notified by the host system 10 with 1 bit, and quantizes the gradation value in a non-dynamic region as the other region, at a bit depth of 2 bits or more. The display unit 30 displays the display image with gradation corresponding to a quantized value obtained by quantization for each pixel. Note that, when the gradation value is quantized with 1 bit, the display unit 30 executes dithering processing for each element of the display image. Here, the display unit 30 diffuses a quantization error of each pixel to other unprocessed pixels arranged within a predetermined range from the pixel in the dynamic region of the element. The display unit 30 updates the quantized values of the other pixels as diffusion destinations. However, the display unit 30 does not diffuse the quantization error of the other pixels as the diffusion destinations to other pixels arranged outside the dynamic region of the element. Therefore, since the quantization error does not propagate outside the dynamic region, rewriting accompanying the update of the quantized value does not occur.

Next, the hardware configuration example of the information processing system S1 will be described.

The host system 10 includes a processor 12, a main memory 14, a chipset 20, and an auxiliary storage medium 22. The host system 10 controls functions of the entire information processing system S1.

The processor 12 controls functions of the entire apparatus including the host system 10. As the processor 12, for example, one or more central processing units (CPUs) may be applied. The processor 12 executes a predetermined program and cooperates with a part or all of the main memory 14, the chipset 20, the auxiliary storage medium 22, and other hardware to perform functions of the host system 10.

In the present application, execution of processing instructed by a command written in a program via the processor 12 or other hardware may be referred to as "execute a program", "execution of a program", or the like.

The main memory 14 is a writable memory that is used as a work area of the processor 12, that is, a reading area for a program to be executed and various kinds of setting data, and a writing area for processing data acquired by executing the program. The main memory 14 includes, for example, a plurality of dynamic random access memory (DRAM) chips. The program to be executed includes an OS, various device drivers for controlling peripheral devices and the like, various services/utilities, an application program (in the present application, may be referred to as an "app"), and the like.

The processor 12 and the main memory 14 function as the minimum system device that forms the host system 10. The host system 10 includes a system device as hardware, and software such as an OS and a schedule task.

The chipset 20 includes one or a plurality of controllers, and is connectable to the display unit 30 and other devices so as to input and output various types of data. The chipset 20 is also referred to as a platform controller hub (PCH). The chipset 20 has, for example, any one or a combination of a plurality of bus controllers such as a universal serial bus (USB), a serial advanced technology attachment (ATA), a serial peripheral interface (SPI) bus, a peripheral component interconnect (PCI) bus, a PCI-Express bus, and a low pin count (LPC).

The auxiliary storage medium 22 stores various programs and data. The various programs include, for example, firmware, a device driver, a service/utility, an app, and the like. These programs are executed by the processor 12. The data to be stored includes data to be processed by the processor 12 and data generated or input by processing. The auxiliary storage medium 22 includes a non-volatile memory such as a flash memory. As the auxiliary storage medium 22, a solid state drive (SSD), a hard disk drive (HDD), or the like may be used.

The display unit 30 includes a timing controller (T-CON) 32 and the EPD panel 34.

The display data is input to the timing controller 32 in accordance with an input/output method defined in a predetermined input/output standard from the host system 10. As the input/output method, for example, a method defined by any of a display (DP) standard, a mobile industry processor interface (MIPI) standard, and the like may be used. The timing controller 32 quantizes a gradation value of each pixel indicated by the input display data at a bit depth corresponding to the drive mode and converts the gradation value into a quantized value. The timing controller 32 generates a drive signal indicating gradation of each pixel in accordance with a display timing of the EPD panel 34 in order to display each pixel in gradation corresponding to the converted quantized value. The timing controller 32 outputs the generated drive signal to the EPD panel 34. The timing controller 32 performs the refresh process at a predetermined refresh rate depending on the drive mode, and determines the gradation value to a predetermined reference value (for example, the minimum value). The timing controller 32 may include, for example, a computing circuit configured of an application specific integrated circuit (ASIC), a field programmable gate array (FPGA), or the like, and may execute a rewritable program to realize its functions, or may be realized by dedicated hardware.

The EPD panel 34 has a substrate, a plurality of pixels, and a drive circuit. The drive circuit applies a voltage corresponding to the specified gradation to a pixel corresponding to a timing specified by the drive signal input from the timing controller 32. The drive circuit includes, for example, a transistor-transistor logic (TTL) circuit. A plurality of pixels is periodically two-dimensionally arranged on a surface of the substrate. Each pixel represents gradation corresponding to the voltage applied from the drive circuit. Each pixel has a pair of electrodes and is configured to hold a solution therebetween. Charged particles made of a pigment are suspended in the solution. The charged particles move toward an electrode having a different polarity from the charged particles in accordance with the applied voltage. This movement causes a change in gradation.

Figure 2:
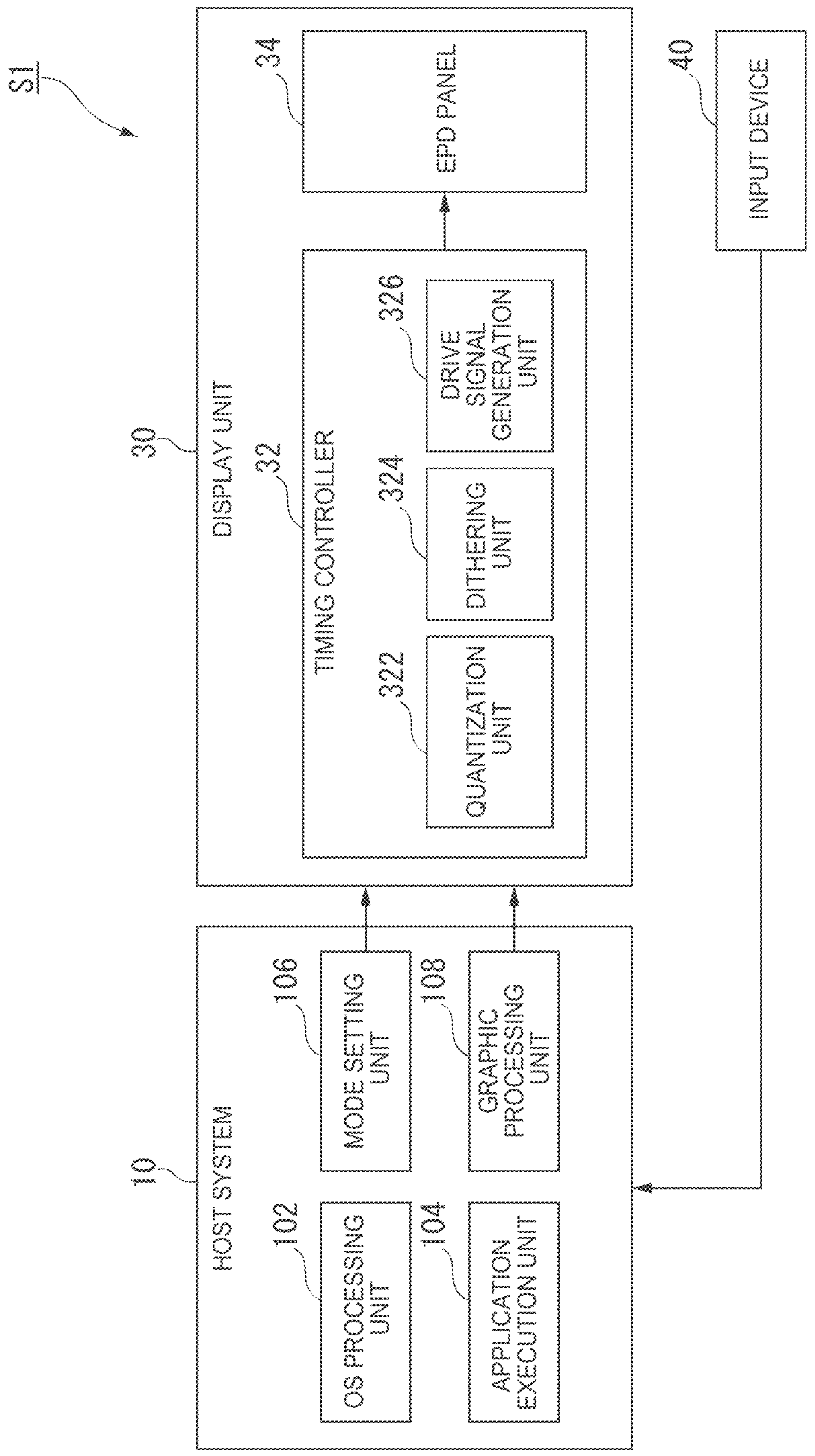
FIG. 2 is a schematic block diagram illustrating a functional configuration example of the information processing system according to the one or more embodiments.

Next, a functional configuration example of the information processing system S1 will be described. FIG. 2 is a schematic block diagram illustrating the functional configuration example of the information processing system S1 according to one or more embodiments.

The host system 10 includes an OS processing unit 102, an application execution unit 104, a mode setting unit 106, and a graphic processing unit 108.

The OS processing unit 102 executes an OS to provide its functions. In the present application, execution of an OS and other programs means executing processing instructed by various commands written in the programs. The functions of the OS include management of resources used for computation processing, storage of data, and the like, provision of a standard interface for the application or the user, and the like. The OS processing unit 102 executes, for example, starting-up of an application, monitoring of an execution state of the application after the application is started up, setting of a display region for an application image, priority control for components of a display image, cursor display, and the like.

The OS processing unit 102 starts up an application specified by an operation signal in response to an operation, and starts its execution. The OS processing unit 102 may start execution of an application whose use environment satisfies a predetermined start-up condition. As the start-up condition, for example, a current time point reaching a predetermined start-up time point (start-up timer) may be applied. The OS processing unit 102 manages an execution state of the application and executes processing on a window (in the present application, may be referred to as an "application window") that accommodates the application image.

In response to an operation, the OS processing unit 102 executes designation of an application window to be focused on as a display target, change of a size of the application window or a position of the application window on the display image, erasure, redisplay, and the like. The OS processing unit 102 displays an application image whose display is started later or an application image operated later among a plurality of application images with higher priority. When a certain application image is displayed with priority, the OS processing unit 102 displays, in a shared region of the certain application image that is shared with other application images, content of the shared region of the certain application image, and does not display content of the shared region of the other application images, which is equivalent to rejection.

The OS processing unit 102 executes various kinds of screen display as the processing instructed by the OS. Various screen components are used in the screen display. The OS processing unit 102 displays a cursor at a position on the display image specified in response to an operation. When a position in the region of the application image is specified in response to an operation, the OS processing unit 102 executes a function of the application corresponding to the position (for example, turning on or off a specific function by pressing a button, and the like). When a position outside the region of the application image is specified in response to an operation, the OS processing unit 102 realizes an OS-specific function or a function of other software related to the OS that corresponds to the position (for example, movement of a data file through a drag operation, and the like). The OS processing unit 102 configures a display image to be displayed on the display unit 30 by superimposing an element image provided by the OS-specific or OS-related function and the application image currently being executed with a predetermined priority.

The application execution unit 104 executes an application that is instructed to be started up by the OS processing unit 102. The application execution unit 104 configures a display image to be displayed as a function in the processing of the application. For example, a video playback application configures a display image forming a video that is instructed to be played. The configured display image is accommodated in an application window assigned to the application.

The mode setting unit 106 specifies the dynamic region for each element from the display image displayed on the display unit 30 and distinguishes the dynamic region from the non-dynamic region as the other region. The mode setting unit 106 monitors a gradation distribution in the display image or an occurrence status of information that may be a variable factor of the gradation distribution for each frame at different time points. The mode setting unit 106 generates a drive command including setting information indicating a portion occupied by the dynamic region of each element in the display image. The mode setting unit 106 outputs the generated drive command to the display unit 30. As a result, the image is displayed in the dynamic region using a different drive mode from the non-dynamic region. An example of a determination method of the dynamic region will be described below.

The graphic processing unit 108 recognizes the display unit 30 connected to the host system 10. The graphic processing unit 108 generates display data indicating the display image configured by the OS processing unit 102 for each frame. The display image of one frame is represented by a gradation value of each pixel. A bit depth of the gradation value is, for example, 8 to 10 bits. The graphic processing unit 108 outputs the generated display image to the display unit 30 and displays the display image. Functions of the graphic processing unit 108 may be realized by executing a graphics driver bundled with the OS, or may be realized by executing a device driver dedicated to the display unit 30.

Next, a functional configuration example of the timing controller 32 will be described.

The timing controller 32 includes a quantization unit 322, a dithering unit 324, and a drive signal generation unit 326.

The quantization unit 322 includes a frame buffer (not illustrated). The display data input from the host system 10 is temporarily stored in the frame buffer, and, each time new display data is input, the stored display data is updated to the new display data.

The quantization unit 322 extracts setting information from the drive command input from the host system 10, specifies the dynamic region of each element indicated by the extracted setting information, and specifies a region outside the dynamic region as the non-dynamic region. The quantization unit 322 sets a 1-bit mode as the drive mode for the dynamic region. The 1-bit mode is a mode in which a pixel is driven with a quantized value obtained by quantizing a gradation value with 1 bit. The quantization unit 322 sets a drive mode of a bit depth of two or more bits (for example, 4 bits) for the non-dynamic region.

The quantization unit 322 reads out the gradation value of each pixel arranged in the dynamic region and the non-dynamic region from the frame buffer for each predetermined reading cycle. The reading cycle may be set to be shorter as the bit depth is smaller.

The quantization unit 322 converts the gradation value of each pixel into a quantized value by quantizing the gradation value at a bit depth set for a region to which the pixel belongs.

The quantization unit 322 notifies the dithering unit 324 of the quantized value of each pixel belonging to a region with a bit depth of 1 bit (may be referred to as a "1-bit region" in the following description), together with the gradation value before conversion and the setting information indicating the element of the display image related to the region.

For a region with a bit depth of 2 bits or more, the quantization unit 322 notifies the drive signal generation unit 326 of the quantized value of each pixel belonging to the region. This is because dithering is not performed on the region. Note that the quantization unit 322 performs the refresh process on the pixels in the region for every predetermined refresh cycle. The refresh cycle may be set to be longer as the drive mode has a greater bit depth. In the refresh process, the quantization unit 322 sets a quantized value of each pixel to a predetermined reference value (for example, a quantized value corresponding to the maximum gradation or the minimum gradation) and then restores the quantized value to the original quantized value. Each time the quantized value is changed, the quantization unit 322 notifies the drive signal generation unit 326 of the quantized value after the change.

The dithering unit 324 performs dithering in the 1-bit region set in the quantization unit 322 to quantize the display data and spatially disperse a quantization error generated by the quantization. The dithering unit 324 specifies the 1-bit region for each element of the display image based on the setting information notified by the quantization unit 322. The dithering unit 324 calculates a difference between a gradation value before quantization and a quantized value for each pixel in the 1-bit region of each element of the display image as the quantization error, and disperses the calculated quantization error to the surrounding unprocessed pixels.

When dispersing the quantization error, matrix computation using a dispersion matrix having a coefficient corresponding to each pixel in each row and each column as a matrix element is repeatedly executed. With the matrix computation, a quantization error of a target pixel to be computed is assigned to an unprocessed pixel as an unprocessed dispersion destination in accordance with a coefficient determined in the dispersion matrix, and is added to the gradation value. The target pixel is changed to an unprocessed adjacent pixel each time single matrix computation is performed, so that, for the unprocessed pixel, the gradation value before quantization and the quantized value obtained by quantizing the gradation value are not determined until the unprocessed pixel becomes the target pixel.

In one or more embodiments, in the matrix computation, when other pixels as dispersion destinations of the quantization error are out of the range of the dynamic region of the element of the display image to which the target pixel belongs, the dithering unit 324 does not perform the dispersion of the quantization error on the other pixels. The dithering unit 324 employs the quantized value finally obtained in each pixel within the region of the 1-bit region and updates the original quantized value to the newly employed quantized value. The dithering unit 324 notifies the drive signal generation unit 326 of the quantized value of each pixel including the updated quantized value. In this way, the dithering unit 324 executes the dispersion of the quantization error for each 1-bit region included in the elements of a series of display images that are spatially connected, and the quantization error does not propagate outside the range of the region.

The drive signal generation unit 326 generates a drive signal having a voltage corresponding to the quantized value of each pixel notified by the quantization unit 322 or the dithering unit 324. The drive signal generation unit 326 outputs, at a different timing for each pixel in a frame cycle, a drive signal having a voltage set for the pixel to the EPD panel 34. A voltage set for each pixel is applied to the EPD panel 34, and display is made with gradation corresponding to the applied voltage.

Next, a display example of an image on the display unit 30 will be described.

Figure 3:
FIG. 3 is a diagram illustrating a first display example of an image on a display unit.
Figure 4:
FIG. 4 is a diagram illustrating a second display example of an image on the display unit.
Figure 5:
FIG. 5 is a diagram illustrating a third display example of an image on the display unit.

FIG. 3 illustrates an original image in which a bit depth of a gradation value is 8 bits. FIG. 4 illustrates a quantized image obtained by quantizing the original image of FIG. 3 with 1 bit. FIG. 5 illustrates a processed image in which the original image of FIG. 3 is subjected to dithering and displayed with a bit depth of 1 bit. The quantized image illustrated in FIG. 4 is represented by simply quantizing the gradation value with one bit. In the original image, a pixel whose gradation value is equal to or greater than an intermediate value (for example, 128 for an 8-bit gradation value) between the maximum value and the minimum value has the maximum gradation and is represented as black. In the original image, a pixel whose gradation is smaller than a predetermined intermediate value has the minimum gradation and is represented by white. Therefore, in the quantized image illustrated in FIG. 4, a gradual spatial change of the gradation in the original image is lost, and an expression of a person represented in the original image is not adequately represented. On the other hand, the processed image illustrated in FIG. 5 is represented by quantizing the gradation value with 1 bit after dithering is performed on the gradation value to diffuse the quantization error. With the dithering, a density of pixels with the maximum gradation is higher in portions with larger gradation values, and a density of pixels with the minimum gradation is lower in portions with smaller gradation values. Since the gradation distribution of the entire image is represented by spatial distribution of a density of pixels whose gradation value is either maximum or minimum, the expression of the person is represented.

Next, the matrix computation related to the dithering will be described. As described above, with the matrix computation, the quantization error occurring in the target pixel to be processed is dispersed to other unprocessed pixels around the target pixel. In one or more embodiments, for example, any method such as a Floyd-Steinberg method, an Atkinson matrix, or a minimized average error method may be employed. The Floyd-Steinberg method is a method using a Floyd-Steinberg matrix illustrated in FIG. 6. The Atkinson method is a method using an Atkinson matrix illustrated in FIG. 7. The minimized average error method is a method using a matrix illustrated in FIG. 8. All of the matrices are used to disperse the quantization error occurring in the target pixel to other unprocessed pixels adjacent to the target pixel.

For example, in FIG. 6, the mark "*" indicates the target pixel. Element values of elements adjacent to a lower left side, a bottom side, a lower right side, and a right side of the target pixel indicate coefficients by which the quantization error is multiplied when the quantization error is dispersed to the corresponding adjacent pixels. Although notation is omitted for the matrix element to the left of the target pixel, zero is set. This indicates that the quantization error is not dispersed to the pixel to the left of the target pixel. The pixel on the left side is a processed pixel.

For example, when the Floyd-Steinberg matrix is applied to the quantization error of the target pixel, the dithering unit 324 calculates a dispersion value by multiplying the unprocessed adjacent pixels that are adjacent to the lower left side, the bottom side, the lower right side, and the right side of the target pixel by 3/16, 5/16, 1/16, and 7/16, respectively. Then, the dithering unit 324 updates the gradation value by adding the calculated dispersion value to each adjacent pixel. The updated gradation value is quantized when the adjacent pixel becomes the target pixel.

Figure 9:
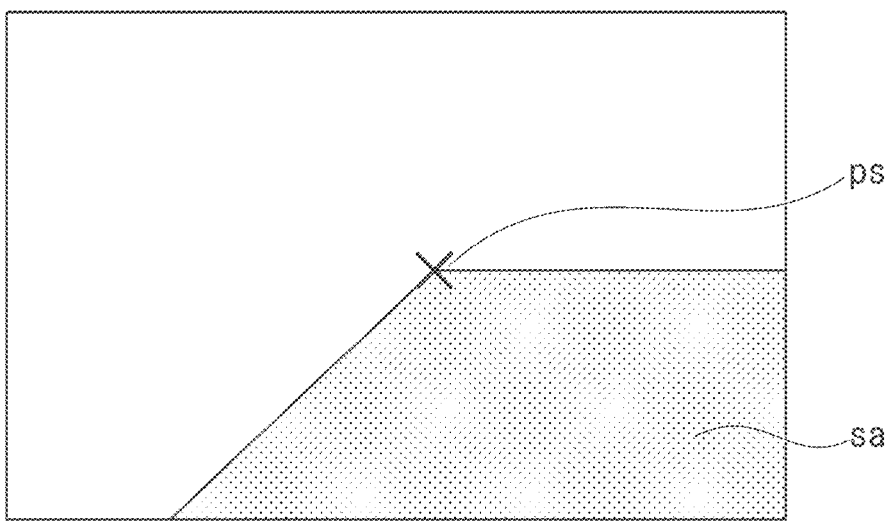
FIG. 9 is a diagram illustrating a first diffusion example of a quantization error.

In the dithering, the target pixel serving as a starting point is set in the leftmost column of the topmost row of the dynamic region. The dithering unit 324 sequentially changes the target pixel to the right-adjacent pixel. When there is no unprocessed pixel on the right side in the dynamic region, the dithering unit 324 changes the target pixel to a pixel in the leftmost column of the adjacent lower row. In this way, the dithering unit 324 changes the target pixel from the left end to the right end for each row, and then changes the target pixel to the left end of the adjacent lower row. When there is no unprocessed pixel in the adjacent lower row, the dithering unit 324 determines that there is no unprocessed pixel, and ends the processing related to the dynamic region. Therefore, the quantization error propagates while being updated as the movement of the target pixel. Then, the quantized value is changed in the pixel as a dispersion destination due to the dispersion of the quantization error. Therefore, in a case where no restriction is placed on the pixel as the dispersion destination of the quantization error, as illustrated in FIG. 9, a range sa affected by the quantization error occurring in a target pixel ps extends to the entire region from the diagonally lower side of the target pixel ps to the lower right end.

Figure 10:
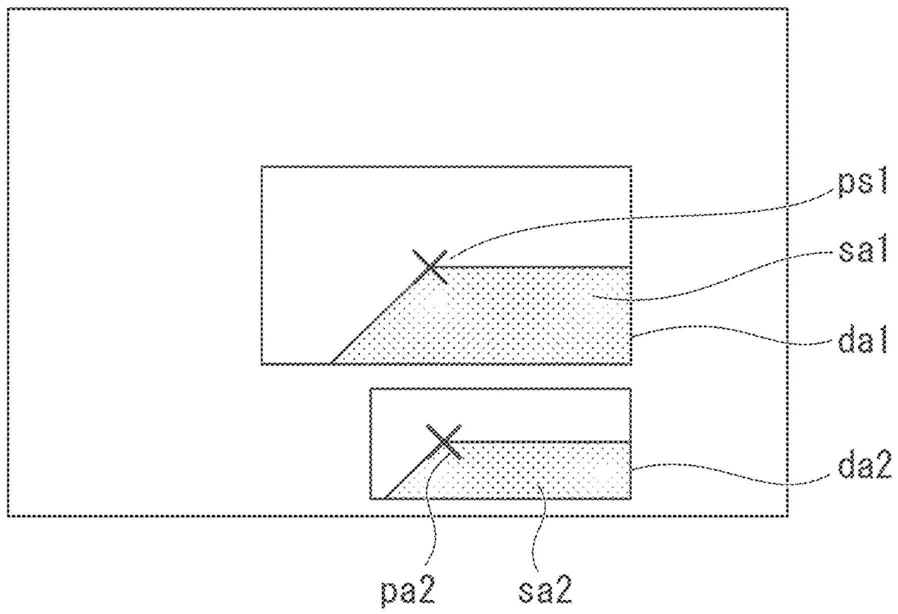
FIG. 10 is a diagram illustrating a second diffusion example of a quantization error.

However, in one or more embodiments, the pixel as the dispersion destination of the quantization error is limited to a pixel in the 1-bit region corresponding to the element of the same display image. In addition, a series of dithering processing is executed using one 1-bit region of each element as a unit. Therefore, the quantization error caused by the dithering is confined in each 1-bit region. In the example of FIG. 10, ranges sa1 and sa2 affected by the quantization errors in which ps1 and ps2 are target pixels ps1 and ps2 are included in ranges of dynamic regions da1 and da2, respectively. For example, since the influence of the quantization error in the dynamic region da1 does not extend outside the range of the dynamic region da1, no rewriting occurs in the change of the quantized value in the dynamic region da1 outside the range. Therefore, by restricting the region in which the rewriting occurs, the deterioration of the pixel and the increase in power consumption due to the repetition of the rewriting are suppressed. In addition, at a boundary of each of the dynamic regions da1 and da2, the distribution of the quantization error is spatially discontinuous. However, the dynamic regions da1 and da2 represent a different image from their surroundings. This means that the gradation is discontinuous at each boundary. Therefore, even when the quantization error is discontinuous at the boundary of each of the dynamic regions da1 and da2, the subjective image quality is not decreased.

Next, a specific example of a method of determining the dynamic region in which the display content dynamically fluctuates in a steady manner for each element of the display image will be described. Examples of the element of the display image that provides the dynamic region include a video image, an application window that accommodates an application image, an image region surrounded by an edge that forms a part of a display screen, and the like.

The mode setting unit 106 is capable of specifying, for example, a display region of a video image that is an element of the display image by executing the following procedure. An application list indicating a predetermined application is set in the mode setting unit 106 in advance. As the predetermined application, an application indicating a display function of a video image is set. The mode setting unit 106 monitors an execution status of the application notified by the OS processing unit 102 and specifies an application that is being executed. The mode setting unit 106 refers to the application list and determines whether or not the specified application that is being executed corresponds to the predetermined application. The mode setting unit 106 specifies a display region of an image related to the application determined to correspond to the predetermined application from the execution status being monitored. The mode setting unit 106 determines the specified display region of the application as the dynamic region.

The mode setting unit 106 is capable of specifying a display region of an application window to be transited by executing the following procedure. The mode setting unit 106 monitors an execution status of the application notified by the OS processing unit 102 for each predetermined observation cycle and specifies each display region of an application that is being executed. The mode setting unit 106 detects a display region whose shape, size, or position has changed from the previous observation cycle until the latest observation cycle among the specified display regions of the application. When the display region is represented by a rectangular application window, the position of the display region can be specified by coordinates of one vertex of the display region and the other vertex opposite to the one vertex. The coordinates may be specified by an operation signal input from the input device 40 in response to an operation. Therefore, the mode setting unit 106 is capable of determining whether or not a transition has occurred in the application window depending on whether or not either or both of the two opposing vertices have changed. The mode setting unit 106 determines the display region of the application window in which the transition has occurred as the dynamic region.

The mode setting unit 106 is capable of specifying an image region surrounded by an edge by executing the following procedure. The mode setting unit 106 executes known edge detection processing on the display image to detect an edge. The edge is a series of regions arranged spatially arranged adjacent such that the length is greater than the width, in which a spatial change in gradation is significantly greater than that of the surrounding region. The mode setting unit 106 specifies a closed region surrounded by the detected edge in the display image as a candidate region that is a candidate for the image region. One candidate region or a plurality of candidate regions may be detected in the display image of one frame. When one candidate region is detected, the mode setting unit 106 specifies the detected candidate region as the image region. When a plurality of candidate regions is detected, the mode setting unit 106 specifies one independent candidate region that does not include other candidate regions as one image region. The mode setting unit 106 specifies, for a group of a plurality of candidate regions having an inclusion relationship, the largest candidate region including all the other candidate regions as one image region, and rejects all the other candidate regions.

Then, the mode setting unit 106 determines whether or not each of the detected image regions corresponds to the dynamic region based on the presence or absence of the dynamic characteristic of the gradation distribution in the image region. The mode setting unit 106 determines, for example, an image region in which fluctuations in gradation distribution occur at a predetermined frequency or more in a predetermined period up to the current time are spatially connected, as the dynamic region. For example, when the gradation distribution does not fluctuate in the image region determined as the dynamic region in the predetermined period up to the current time, the mode setting unit 106 determines the image region as the non-dynamic region.

Figure 11:
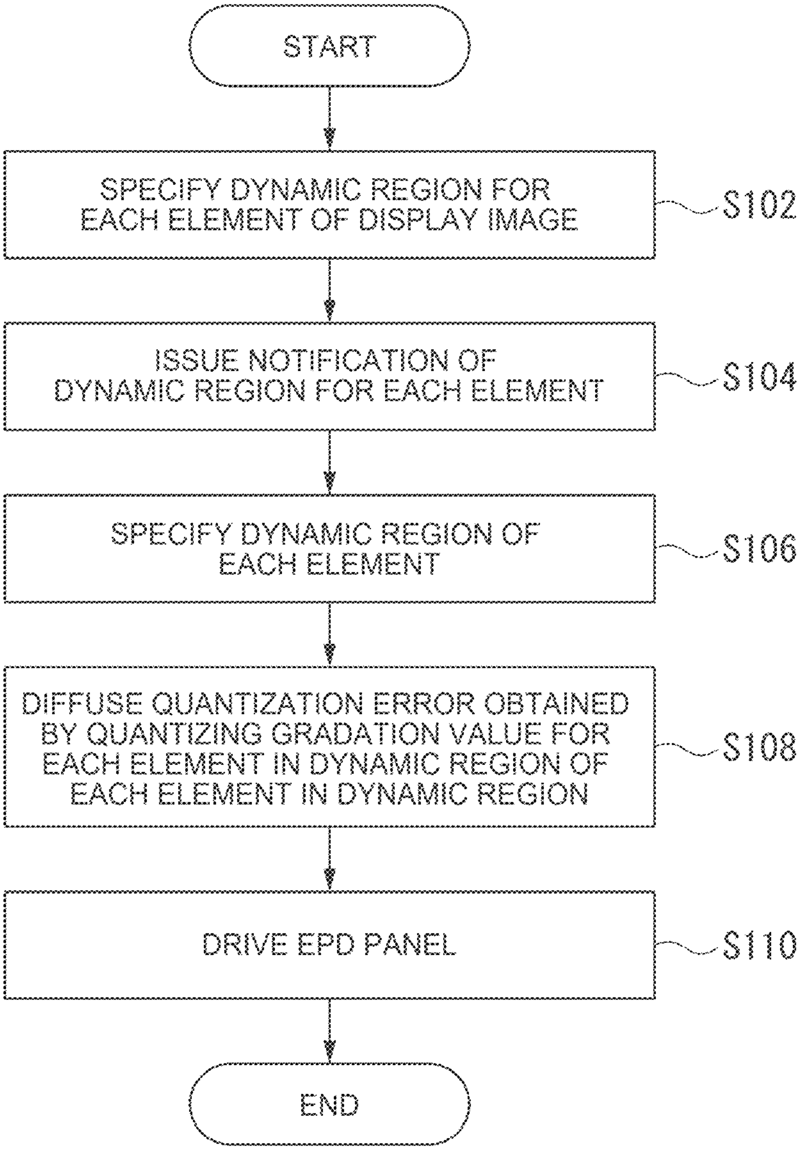
FIG. 11 is a diagram illustrating a driving process of the display unit according to one or more embodiments.

Next, an example of a driving process of the display unit 30 according to one or more embodiments will be described. FIG. 11 is a diagram illustrating the driving process of the display unit 30 according to one or more embodiments. (Step S102) The mode setting unit 106 of the host system 10 specifies a dynamic region for each element of the display image to be displayed on the display unit 30. (Step S104) The mode setting unit 106 notifies the setting information indicating the specified dynamic region of each element to the timing controller 32 of the display unit 30.

(Step S106) The quantization unit 322 of the timing controller 32 specifies the dynamic region of each element indicated by the setting information notified by the host system 10. The quantization unit 322 determines the drive mode for the specified dynamic region as a 1-bit mode, and determines the drive mode for the non-dynamic region as the other region, as a drive mode with a larger bit depth (for example, a 4-bit mode).

(Step S108) The quantization unit 322 quantizes the gradation value at the bit depth of the drive mode determined for each pixel, and notifies the drive signal generation unit 326 of the quantized value obtained by the quantization. The dithering unit 324 diffuses the quantization error obtained by quantizing each target pixel in the dynamic region of each element with 1 bit to other unprocessed pixels in the dynamic region, and does not diffuse the quantization error outside the dynamic region. The dithering unit 324 notifies the drive signal generation unit 326 of the quantized value updated by the diffusion of the quantization error.

(Step S110) The drive signal generation unit 326 drives the pixels arranged on the EPD panel 34 with a voltage corresponding to the notified quantized value of each pixel and displays the pixels in gradation corresponding to the quantized value. Then, the processing in FIG. 11 ends.

As described above, the information processing system S1 according to one or more embodiments includes the host system 10 and the display unit 30, and the display unit 30 includes a controller (for example, the timing controller 32) and an electrophoretic display panel (for example, the EPD panel 34). The controller drives pixels arranged on the electrophoretic display panel based on a quantized value indicating gradation for each pixel. The host system 10 specifies a dynamic region in which a display content dynamically fluctuates for each element of a display image to be displayed on the display unit 30, and the controller quantizes a gradation value for each pixel included in the specified dynamic region with 1 bit to compute the quantized value, diffuses a quantization error of each pixel to other pixels arranged within a predetermined range from the pixel in the dynamic region of the element of the display image and updates the quantized value of the other pixels, and does not diffuse the quantization error of the pixel outside the dynamic region.

With this configuration, the diffusion destination of the quantization error is limited to the unprocessed pixel in the dynamic region of each element, and is not diffused outside the dynamic region. Since the update of the quantized value due to the diffusion of the quantization error is restricted within the dynamic region, it is possible to reduce the frequency of rewriting. Therefore, it is possible to extend the period to reach the end of the lifespan by reducing the rewriting. In addition, since it is possible to suppress the consumption of power generated by rewriting, it is possible to reduce the power consumption.

In addition, one or more embodiments may be implemented as follows.

The host system 10 may be configured to determine a display region of a video image included in the display image as the dynamic region that is an element of the display image.

The host system 10 may be configured to determine a display region of an application image that is included in the display image and that transits as the dynamic region that is an element of the display image.

The host system 10 may be configured to detect an edge from the display image, and determine a region that is surrounded by the detected edge and in which display content dynamically fluctuates as the dynamic region that is an element of the display image.

A controller (for example, the timing controller 32) that drives pixels arranged on an electrophoretic display panel (for example, the EPD panel 34) based on a quantized value indicating gradation for each of the pixels is configured to quantize a gradation value of each pixel included in a dynamic region of each element of a display image notified by the host system 10 at a bit depth lower than a bit depth of a pixel included in a non-dynamic region to compute the quantized value, diffuse a quantization error of each pixel to other pixels arranged within a predetermined range from the pixel in the dynamic region of the element and update the quantized value of the other pixels, and not diffuse the quantization error of the pixel outside the dynamic region.

In a control method for the information processing system S1 including the host system 10 and the display unit 30, the display unit includes a controller (for example, the timing controller 32) and an electrophoretic display panel (for example, the EPD panel 34), the controller is configured to drive pixels arranged on the electrophoretic display panel based on a quantized value indicating gradation for each of the pixels. The host system 10 specifies a dynamic region in which display content dynamically fluctuates for each element of a display image to be displayed on the display unit 30, and the controller quantizes a gradation value of each pixel included in the specified dynamic region at a bit depth lower than a bit depth of a pixel included in a non-dynamic region to compute the quantized value, quantizes the gradation value of each pixel included in the dynamic region with 1 bit to compute the quantized value, diffuses a quantization error of each pixel to other pixels arranged within a predetermined range from the pixel in the dynamic region of the element and updates the quantized value of the other pixels, and does not diffuse the quantization error outside the dynamic region.

Although embodiments of the present invention have been described in detail with reference to the drawings, the specific configurations are not limited to the above-described embodiments, and the present application includes designs and the like within a scope not departing from the spirit of the invention. It is possible to optionally combine the configurations described in the above-described embodiments.

DESCRIPTION OF SYMBOLS

S1 information processing system
10 host system
12 processor
14 main memory
20 chipset
22 auxiliary storage medium
30 display unit
32 timing controller
34 EPD panel
40 input device
102 OS processing unit
104 application execution unit
106 mode setting unit
108 graphic processing unit
322 quantization unit
324 dithering unit
326 drive signal generation unit

What is claimed is:

1. An information processing system comprising:
a host system; and
a display unit, wherein
the display unit includes a controller and an electrophoretic display panel,
the controller is configured to drive pixels arranged on the electrophoretic display panel based on a quantized value indicating gradation for each of the pixels,
the host system is configured to
detect an edge from a display image, and
determine a region that is surrounded by the edge and in which display content dynamically fluctuates for each element as the dynamic region, and
the controller is configured to
quantize a gradation value of each pixel included in the dynamic region with 1 bit to compute the quantized value,
diffuse a quantization error of each pixel to other pixels arranged within a predetermined range from the pixel in the dynamic region of the element and update the quantized value of the other pixels,
diffuse, with a spatially discontinuous distribution, the quantization error of pixels arranged at the edge and update the quantized value of the pixels arranged at the edge, and
not diffuse the quantization error outside the edge.

2. The information processing system according to claim 1,
wherein the host system is configured to determine a display region of a video image included in the display image as the dynamic region.

3. The information processing system according to claim 1,
wherein the host system is configured to determine a display region of an application image that is included in the display image and that transits as the dynamic region.

4. A controller that drives pixels arranged on an electrophoretic display panel based on a quantized value indicating gradation for each of the pixels,
the controller being configured to
quantize a gradation value of each pixel included in a dynamic region of each element of a display image notified by a host system at a bit depth lower than a bit depth of a pixel included in a non-dynamic region to compute the quantized value,
diffuse a quantization error of each pixel to other pixels arranged within a predetermined range from the pixel in the dynamic region of the element and update the quantized value of the other pixels,
diffuse, with a spatially discontinuous distribution, the quantization error of pixels arranged at an edge of the dynamic region and update the quantized value of the pixels arranged at the edge, and
not diffuse the quantization error of the pixel outside the edge.

5. A control method for an information processing system including a host system and a display unit, wherein the display unit includes a controller and an electrophoretic display panel, and the controller is configured to drive pixels arranged on the electrophoretic display panel based on a quantized value indicating gradation for each of the pixels, the control method comprising:
via the host system,
detecting an edge from a display image, and
determining a region that is surrounded by the edge and in which display content dynamically fluctuates for each element as the dynamic region, and
via the controller,
quantizing a gradation value of each pixel included in the dynamic region at a bit depth lower than a bit depth of a pixel included in a non-dynamic region to compute the quantized value,
quantizing the gradation value of each pixel included in the dynamic region with 1 bit to compute the quantized value,
diffusing a quantization error of each pixel to other pixels arranged within a predetermined range from the pixel in the dynamic region of the element and updating the quantized value of the other pixels,
diffusing, with a spatially discontinuous distribution, the quantization error of pixels arranged at the edge and updating the quantized value of the pixels arranged at the edge, and
not diffusing the quantization error outside the edge.

* * * * *